A. & J. AIRD.
Rotating Hooks for Sewing-Machines.
No. 136,635. Patented March 11, 1873.
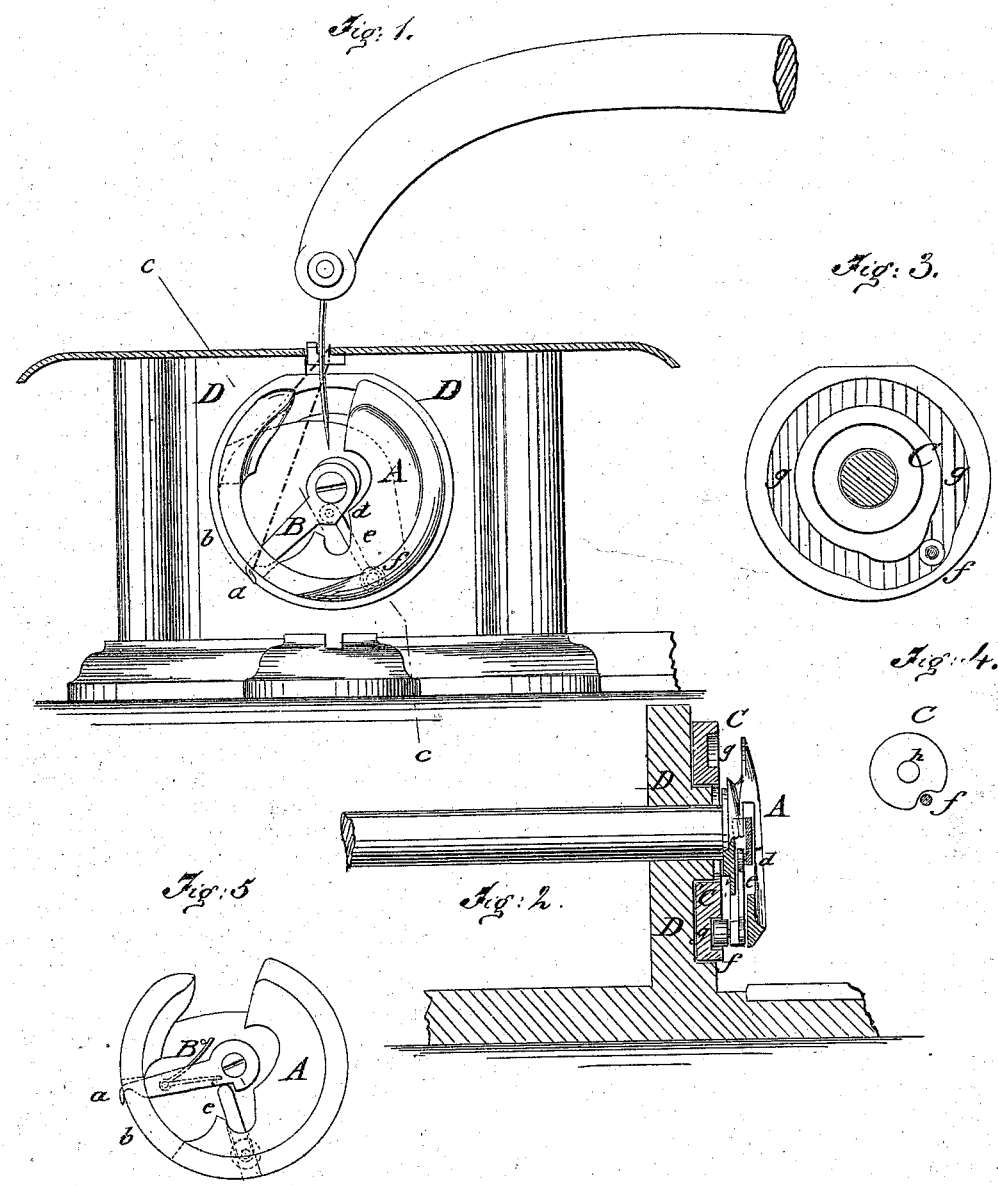

UNITED STATES PATENT OFFICE.

ANDREW AIRD AND JOHN AIRD, OF TROY, NEW YORK.

IMPROVEMENT IN ROTATING HOOKS FOR SEWING-MACHINES.

Specification forming part of Letters Patent No. 136,635, dated March 11, 1873.

*To all whom it may concern:*

Be it known that we, ANDREW AIRD and JOHN AIRD, of Troy, in the county of Rensselaer and State of New York, have invented a new and Improved Rotating Hook of Wheeler & Wilson Sewing-Machines, of which the following is a specification:

Figure 1 is a front view of the rotating hook, showing our improved reciprocating hook for arresting the loop. Fig. 2 is a vertical transverse section of the same on the line $c\ c$, Fig. 1. Fig. 3 is a front view of the cam for regulating the motion of the reciprocating hook back of the rotating hook. Fig. 4 shows the arrangement of the cam in front of the rotating hook, and Fig. 5 shows the application of a spring behind the reciprocating hook, which is merely moved forward by a detached sliding cam-follower and backward by the spring.

Similar letters of reference indicate corresponding parts.

The object of our invention is to substitute for the present brush loop-check applied to the rotating hook of Wheeler & Wilson sewing-machines a device which does the same work with great regularity, rapidity, and security, avoiding the insufficient working of the brush-check and the annoyance resulting therefrom. Our invention consists in a reciprocating hook placed inside of the rotating hook and in connection with and regulated by a cam in such a manner that the loop is straightened and held until the rotating hook is near the needle ready to take up a new loop.

By the use of our reciprocating hook the usual brush-check of the Wheeler & Wilson machine can be entirely dispensed with.

In the drawing, A represents the rotating hook of the usual form. At its center is applied, by a screw or otherwise, the reciprocating hook B, which projects, with its downward-bent end $a$, through a slot, $b$, cut in the rim of the rotating hook. The interior part of the rotating hook is grooved so as to allow a free and unobstructed play of hook B in the slot $b$. A pin, $d$, applied at the lower side of hook B, connects with a link, $e$, and small friction-roller $f$ at end thereof, which projects through a slot cut into the rotating hook A. A stationary cam, C, is applied to the bed-plate D behind the rotating hook A, and grooved in such a manner that the friction-roller $f$ moves freely therein with the rotations of hook A. The grooved recess $g$ is formed slightly eccentric at one part, so that friction-roller $f$, when entering therein, compels a gradual downward motion of the reciprocating hook B by means of link $e$ and pin $d$, and a release of the same as soon as the eccentric part of the cam is passed. The eccentric part is so placed that it acts on hook B precisely at the same point at which the brush-check retarded and held the loop. This action is now accomplished by the end $a$ of the reciprocating hook B, for, as soon as the loop is taken up by the point of the rotating hook and carried along over the circumference thereof and the bobbins the friction-roller $f$, by entering the eccentric groove $g$ of cam C, causes the reciprocating hook to move backward in and revolve slower than the rotating hook, and thereby hold the loop until the point of the rotating hook approaches the needle, when the reciprocating hook is moved forward in and revolves faster than the rotating hook to its former position, thereby releasing the loop and allowing it to be drawn up by the rotating hook and needle.

Instead of applying the cam C behind the rotating hook A, the same may be placed in a recess in front thereof by connecting it with a spindle, $h$, running through the hollow shaft of the rotating hook and imparting in a similar manner the requisite motion to the reciprocating hook B, Fig. 4. The return of the hook B to its former position and the consequent releasing of the loop may be assisted by a small spring, $i$, placed underneath the hook, as in Fig. 5.

Instead of having the reciprocating hook linked or pivoted to the cam-follower, the latter may be detached from the reciprocating hook and slide in a groove in the rotating hook, and with its inner end against the arm of the reciprocating hook, as in Fig. 5, wherein the cam-follower $e'$ merely presses the hook B forward, and the spring $i$ presses it backward in the rotating hook.

Having thus described our invention, we claim as new and desire to secure by Letters Patent—

1. The reciprocating hook B attached to and working in connection with the rotating hook A, for straightening and holding the loop, substantially as described.

2. The cam C, in connection with pin $d$, link $e$, and friction-roller $f$, for the purpose of imparting the requisite motion to reciprocating hook B, substantially as set forth.

3. The combination of the hook B, rotating hook A, cam C, pin $d$, link $e$, and friction-roller $f$, substantially as specified.

ANDREW AIRD.
JOHN AIRD.

Witnesses:
WILLIAM HAMILTON,
A. McFARLAND.